United States Patent [19]

DeWalt

[11] 4,094,481

[45] June 13, 1978

[54] FAIL PASSIVE DUAL SERVO WITH CONTINUOUS MOTOR SPEED AND ACCELERATION AND MONITORING

[75] Inventor: Michael P. DeWalt, Phoenix, Ariz.

[73] Assignee: Sperry Rand Corporation, New York, N.Y.

[21] Appl. No.: 811,653

[22] Filed: Jun. 30, 1977

[51] Int. Cl.² .......................... G05D 1/00; G05B 9/03
[52] U.S. Cl. .................................... 244/194; 318/564; 318/566
[58] Field of Search .............. 91/363 A; 235/153 AE; 244/194; 307/219; 318/563–565, 616, 566; 340/146.1 BE; 364/307

[56] References Cited

U.S. PATENT DOCUMENTS

| | | | |
|---|---|---|---|
| 3,143,693 | 8/1964 | Fearnside et al. | 318/564 X |
| 3,462,662 | 8/1969 | Carpenter | 318/565 |
| 3,593,092 | 7/1971 | Flippo | 318/564 |
| 4,035,705 | 7/1977 | Miller | 244/194 X |

*Primary Examiner*—Stephen G. Kunin

*Attorney, Agent, or Firm*—Howard P. Terry; Albert P. Cefalo

[57] ABSTRACT

The servomotor outputs of two substantially identical servo channels, are connected through a differential mechanism to position an attitude control surface of an aircraft in response to common or separate command signals applied to the respective channels. The dual channels are continuously monitored in such a manner that if the velocities and accelerations of the two servomotor outputs do not track each other within predetermined ratio limits, appropriate servo brakes will clamp the output of the servomotor with the highest acceleration, or the failed channel. The rapidity with which the failed channel is detected and the servo brakes applied assures that essentially no control surface motion occurs and hence no attitude or flight path transients are evident by reason of the failure. Clamping of the failed servomotor, moreover, assures that the remaining servo channel may remain operative. In addition to and simultaneous with the clamping of the failed channel, the pilot is warned by appropriate alerting devices of the failure so that he may disconnect the autopilot and manually take over control.

7 Claims, 3 Drawing Figures

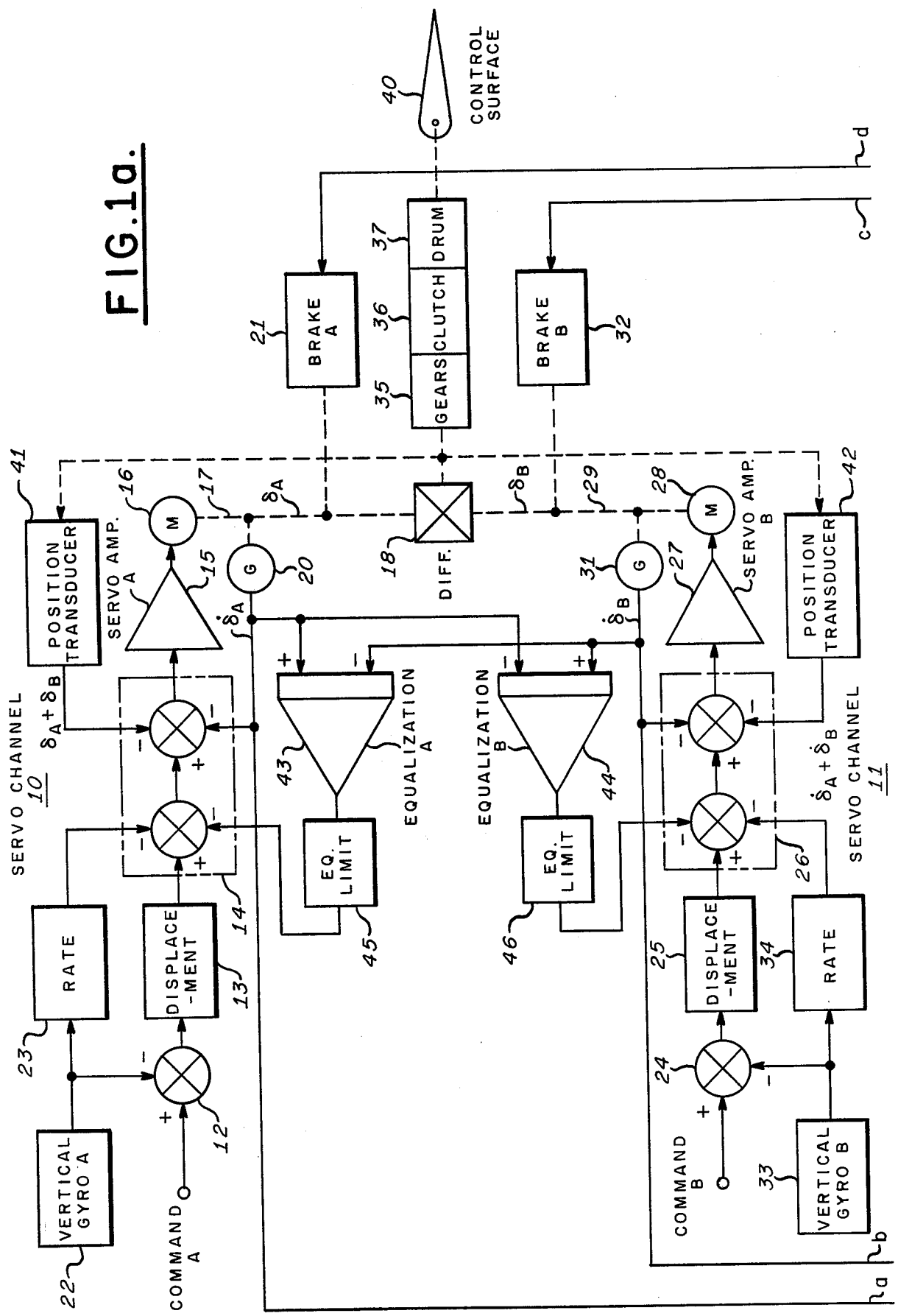

FAIL PASSIVE DUAL SERVO WITH CONTINUOUS MOTOR SPEED AND ACCELERATION AND MONITORING

BACKGROUND OF THE INVENTION

1. Field of the Invention

The present invention relates to automatic flight control systems for aircraft and, more particularly, to monitored fail passive dual channel aircraft flight control systems for positioning the attitude control surfaces thereof.

2. Description of the Prior Art

As is known, aviation regulatory agencies impose safety requirements on the performance of aircraft automatic flight control systems. For example, with regard to the aircraft pitch axis, should a malfunction occur, the change in normaL acceleration of the aircraft must be limited to values which are typically in the range of plus or minus one g. Conventionally, accurate servomotor torque limiting is utilized to limit the servomotor torque to a value such that the maximum permitted normal acceleration or load factor will not be exceeded at the most critical flight condition of the aircraft. Typically, servo authority limit is established on the basis of the high speed regime of the aircraft with an aft center of gravity. Present day requirements in some instances are even more stringent and require that the maximum load factor not be exceeded due to a hardover malfunction in a particular direction when the automatic pilot is holding the pitch attitude control surface at its maximum limit in the opposite direction, as might occur due to a mistrimmed craft condition. As conventional torque limiting is designed for a single flight condition, the prior art practice severely limits performance at other flight conditions. In general, performance under such conditions which require greater servo authority than that provided by the torque limit is seriously compromised. Typically, such a compromise condition would exist at low speeds with a forward center of gravity such as under landing approach conditions. Thus, although excessive load factor maneuvers are prevented, performance of the aircraft over portions of its flight envelope may be seriously jeopardized.

Performance of such prior art systems are therefore sensitive to changes in aircraft configuration such as changes in speed, center of gravity position, flap-slat position, horizontal stabilizer position, changes in variable geometry aerodynamic control surface configurations and the like. Some prior art systems utilize monitor circuits to enable increased torque to be utilized; such systems are, however, sensitive to nuisance disconnects or false alerts.

Dual channel servo actuator systems are known in the prior art. The present invention, moreover, is an improvement of the monitored dual channel servo system disclosed in U.S. Pat. No. 4,035,705 to H. Miller entitled "Fail-Safe Dual Channel Automatic Pilot with Maneuver Limiting" which issued on July 12, 1977, to the present assignee of the instant disclosure. This patent discloses two servo channels, the mechanical outputs of which are coupled through a differential mechanism to position a control surface in a manner similar to the present disclosure. The apparatus of this patent reacts to the aircraft outer loop command source by processing the separate command signals through redundant displacement and rate limiting devices. In the pitch axis, separate normal accelerometers control each channel's command rate limit so as to prevent excessive pitch maneuvers due to the command source. Redundant polarity comparators are included for comparing the polarity or the incremental load factor with the polarity of each servo channel output and for applying a brake to clamp the output of a failed servo channel when the polarity of the incremental load factor is of the same sense as, i.e., agrees with the servomotor direction and the incremental load factor exceeds a predetermined level.

A further example of the prior art is U.S. Pat. No. 3,462,662 entitled "Monitoring and Fault Correction System for a Multiple Channel Servo Actuator" which issued on Aug. 19, 1969 in the name of W. E. Carpenter. Carpenter U.S. Pat. No. 3,462,662 is directed to a plurality of servo channels coupled through a differential mechanism in a manner similar to the present disclosure for actuation of a control surface. The monitor system of the Carpenter patent, however, reacts to a failure after one channel has failed to a saturated amplifier. That is, a difference threshold detector, in response to signals from the servo velocity generators thereof, which exceed a predetermined value that corresponds to the upper signal limit expected during normal operation, closes a set of relay contacts which couple a test signal from a test signal generator to the multiple servo channels. Inasmuch as one servo amplifier is in a saturated condition, the test signal applied to its respective channel does not alter the output condition of the motor associated therewith. However, the test signal applied to the operative channel is passed to the servo amplifier which acts upon it to either increase or decrease the output speed of the servomotor. Rate circuits detect the rate of change in the output signal from the velocity generators due to the test signals and, a threshold detector set at a predetermined value coupled to each rate circuit assures that the output thereof is not a spurious transient signal. The threshold detectors are then coupled through logic gate means to enable braking means to clamp the failed channel. Carpenter's U.S. Pat. No. 3,462,662 monitoring concept depends upon the reaction of the dual channels to a test signal applied thereto if a speed difference between the servoes is detected. Thus, in Carpenter, the braking of the failed channel can occur only after the failure is detected, a test signal is applied, the failed channel is identified and a threshold is exceeded.

Accordingly, it is necessary to provide a control system with means to rapidly detect a failure during the acceleration of the respective servomotor associated therewith such that any single failure will not cause significant movement or acceleration of the aircraft at any flight condition.

SUMMARY OF THE INVENTION

In accordance with the present invention, an automatic flight control system is provided which overcomes the difficulties and sluggishness of the prior art control systems and which provides safe and effective servo authority over the entire flight operating envelope of the aircraft without requiring servo torque limiting, maneuver response of the aircraft or the application of test signals. The present monitoring technique is fail passive for all types of malfunctions, without compromising performance and is not sensitive to nuisance warnings and disconnects, as a result of the braking or clamping of the failed servo output, indicated by the velocity and acceleration ratios of the servomotors in a very rapid manner and before any significant surface deflection can occur. Thereby, the remaining servo is able to maintain stabilization and flight path control and to hold any trim load.

Specifically, a preferred embodiment of this invention includes a dual channel servo system, the dual servomotor output thereof being combined in a mechanical summing device, such as a differential gearing, which positions the attitude control element of an aircraft in response to command signals applied to both channels. The dual channel system is monitored in such a fashion that movement of the attitude control surface caused by a failure in either of the channels is essentially prevented to thereby eliminate undesired attitude or flight path transients. In such a system, the differential gearing to which the inputs of the servomotors of each channel are applied requires that the servomotor's speed/torque characteristics track each other within a predetermined limit. The monitoring arrangement of the present invention is based on this requirement. Thus, in the present invention, a failure is indicated when the ratio of the absolute value of the difference between the motor's speeds to the absolute value of the speed of each motor plus a small bias to minimize nuisance trips at low servo velocity exceeds a predetermined value consistent with component and manufacturing tolerances. The failure or malfunction is further assessed by determining the ratios of the absolute values of the acceleration of each servomotor with respect to the other and if either ratio exceeds a predetermined value, also consistent with component and manufacturing tolerances a small bias is also included to minimize nuisance trips at low accelerations, logic circuitry responsive also to the speed ratio monitor, actuates the servomotor brake of the servo having the highest acceleration whereby to prevent any input from that servomotor to the differential and hence any movement of the control surface resulting therefrom. Pilot warning lamps are lit to advise the pilot of the failure situations.

The various features of novelty which characterize the invention are pointed out with particularity in the claims annexed to and forming a part of this specification. For a better understanding of the invention, its operating advantages and objects, reference should be had to the accompanying drawings and specifications in which there is illustrated and described a preferred embodiment of the invention.

BRIEF DESCRIPTION OF THE DRAWINGS

FIGS. 1A and 1B together illustrate in block-diagram a preferred embodiment of the present invention.

DESCRIPTION OF THE PREFERRED EMBODIMENT

The present invention involves a dual channel servo system that combines through a differential the outputs of each channel to position an attitude control surface of an aircraft in response to command signals applied to both channels. A property of such dual channel servo system utilized advantageously in the invention is that motion of the attitude control surface that would be caused by a failure in one channel is compensated by motion of the other channel such that the system fails in a safe and passive manner. Such systems may utilize either reversible or irreversible individual servo actuators whose outputs are combined by a motion summing mechanism. Applicant's assignee's U.S. Pat. No. 3,504,248 also to Miller issued Mar. 31, 1970 describes the basic over-all functioning of such a dual servo system.

The present invention is an improvement over a similar dual channel servo system disclosed in the above-mentioned Miller U.S. Pat. No. 4,035,705. As described in both of these patents, the failure compensation property is inherently obtained because the differential gear mechanism thereof is utilized at a reversible point in the system to combine and couple the motions of the two servo channels to the control surface. It is the inherent property of a mechanical differential in a reversible mechanism that it will transmit to one of its members the weaker of two torques applied at its other elements. For example, when two elements are driven from equal torques from two sources of torque such as electric servomotors the third element will be driven in accordance with the sum of the torques. However, if one of the two sources of torque is less than both the other source of torque and the third or load torque, the one source will be back driven by the sum of the first source and load. As described by Miller, the failure compensating effect is achieved by the servo position minor loop electrical feedback around each channel and utilizing the above differential characteristic to provide reaction of the valid servo channel to cancel motion of the invalid servo channel.

Figure 1B:
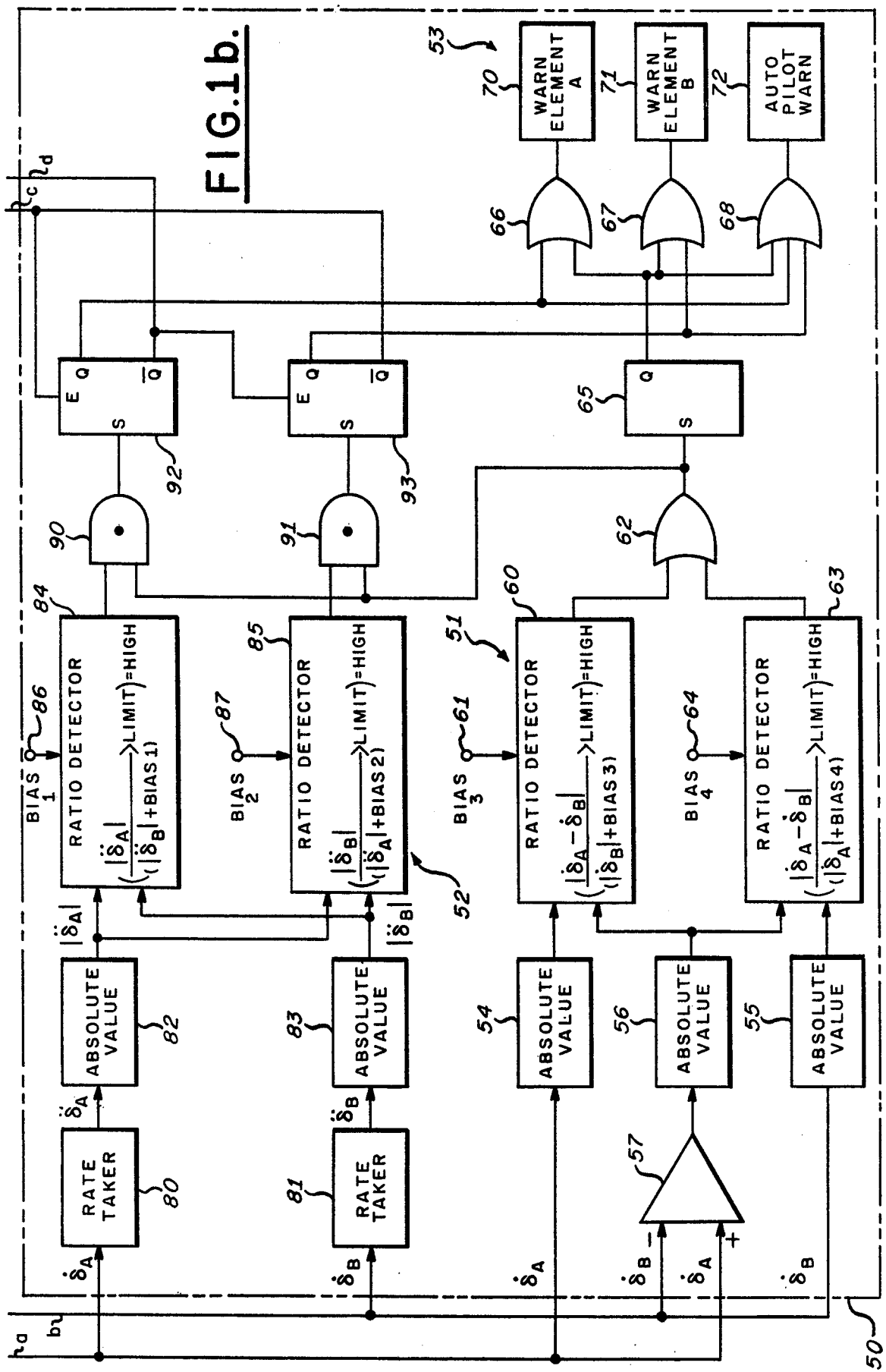

Although the present invention is advantageously applicable to provide a wide variety of control functions, the invention will be described in connection with the automatic control of the pitch axis of an aircraft since the failure in this axis is most critical in terms of safety of flight. Referring to FIGS. 1A and 1B of the drawings, the dual channel servo system is substantially as disclosed in the above patent. As the structure and operation of basic stabilization and control of the present system is the same as fully described in this patent, it will only be briefly discussed herein for continuity. The dual channel servo system is comprised of a first servo channel A and a second servo channel B. The "A" servo channel 10 is responsive to a command signal A and an attitude reference signal from vertical gyro 22 summed at 12, displacement gain adjusted by element 13 and applied to summing network 14 where a short term rate stabilization signal from attitude rate network 23 and servo position feedback signals from transducer 41 are added, the resultant signal being applied to a servo amplifier 15, all in conventional fashion. The servo amplifier 15 drives the servomotor 16 which through a servo output shaft 17, drives one input of a reversible mechanical differential 18. The motion of the servo output shaft 17 is designated as $\delta_A$. A tachometer generator 20 is coupled to the shaft 17 and measures the speed or velocity $\dot{\delta}_A$ of the output of the servomotor 16 as indicated, its signal also being applied in conventional rate feedback fashion to summing network 14. The tachometer 20 signal is also utilized for monitoring purposes in accordance with the present invention as will be described below. The output shaft 17 of the "A" servo channel 10 may be clamped by a brake 21 and is instrumented as an electrical brake of a type which is spring actuated to its clamped position when the electrical power is removed from the brake solenoid thereby constituting a fail-safe brake.

The redundant "B" servo channel 11 is identical to the "A" channel and includes components substantially identical to the components 12-17 and 20-23, of the servo channel 10 and are designated by reference numberals 24-29 and 31-34, respectively.

The mechanical differential gear 18 algebraically sums the velocities of the servomotors 16 and 28, and provides the summed or resultant velocities through power gears 35, electric clutch 36 and a cable drum 37 to actuate the elevator control surface 40 in the same manner as described in the referenced Miller patents.

The net output of the duplex servo from the differential gear 18 is proportional to control surface position and is measured redundantly by servo position sensors 41 and 42 such as synchro transducers coupled to the output of the differential gear 18 by an appropriate mechanical gear coupling. The output of each of the sensors 41 and 42 represents the algebraic sum of the motions of the two servomotors 16 and 28 as indicated by the legend $\delta_A + \delta_B$ in the drawing. These signals are utilized as independent servo position feedback signals to the servo channels 10 and 11, through their respective summing networks 14 and 26.

As stated, the significant characteristic of the reversible mechanical differential gear 18 having two sources of torque applied to the inputs thereof from the servo output shafts 17 and 29 is that the differential gear 18 equalizes the net torque output requiring each of the motors 16 and 28 to generate nearly identical values of torque as seen at the inputs of differential 18. Should one servo tend to generate more torque than the other, the differential 18 causes the motors 16 and 28 to rotate at different speeds. In accordance with the system described in Miller's U.S. Pat. No. 4,035,705, an active failure, for example, a hardover failure in one of the redundant elements of the control system results in a significant motion of the control surface 40. This output is the result of the minor loop servo position feedback of the valid channel from the associated sensor 41 or 42 which rapidly cancels the servo motion of the failed channel causing the servomotors 16 and 28 to rotate in opposite directions. A failure in one of the redundant elements of the system resulting in one motor failing to drive, results in correct but much reduced servo output due to the operation of the valid channel in backdriving the failed servo against its reaction load produced by factors such as back EMF, windage and friction. Thus, in Miller's U.S. Pat. No. 4,035,705, a channel failure is compensated by sensing craft movement resulting from the above operation; hence surface motion is required.

The inherent torque equalization characteristics of the dual servo configuration as explained above and in the Miller patents may cause equal and opposite rotations of the motors 16 and 28 in the presence of normally expected spurious signals due to servo amplifier unbalance and differences in the gradients and nulls of the stability and path command signals of the two channels. The degree of unbalance normally expected can be of such magnitude as to result in full speed output of the motors 16 and 28 in opposite directions with respect to each other, thus resulting in total loss of control authority of the system. Electrical equalization is therefore utilized between the two channels in a manner which requires the motors 16 and 28 to track each other, within equalization limits, with regard to speed and direction thereby providing adequate control authority. Accordingly, as taught by Miller, the outputs of the tachometer generators 20 and 31 are applied as inputs to redundant equalization integrators 43 and 44 in such a manner that two signals are provided which represent the integral of the difference between the signals $\dot\delta_A$ and $\dot\delta_B$. The outputs of the equalization integrators 43 and 44 each provide separate equalization signals to equalizer limiters 45 and 46, respectively, and the outputs thereof are applied to summing networks 14 and 26, respectively. The polarities of the equalizing signals applied to the amplifiers 14 and 26 are chosen with regard to the polarity of the difference taken at the equalization integrators 43 and 44 such that the speeds and directions of rotation of the motors 16 and 28 are forced to track each other as long as the equalization signals are within specified values as determined by the two independent limiters 45 and 46, the values of the limiters being set to account for normal tolerances in the two redundant channels.

The operation of the control system described up to this point is generally the same as in the Miller U.S. Pat. No. 4,035,705 and is also similar in some respects to that of the Carpenter U.S. Pat. No. 3,462,662 patent. However, the monitoring principle of the present invention is very different from that taught in these two patents. In Carpenter U.S. Pat. No. 3,462,662, the monitoring principle is based upon the response of the dual channels to an arbitrary test signal which is inserted only after a failure has been detected while in Miller's U.S. Pat. No. 4,035,705 the monitoring principle is based on the response of the aircraft itself upon failure of a channel. In the present monitoring system now to be described, the ratios of the speeds and accelerations of the servomotors are continuously computed and if they depart from predetermined set values, the faulty channel is substantially instantaneously identified and motor brakes are applied such that no significant surface motion occurs and hence no resulting motion of the aircraft. This is extremely important during a blind approach to a landing where even small departures from the desired flight path may be critical. In substantially all types of failure situations, the monitor of the present invention will immediately clamp the offending channel thereby permitting the good channel to continue functioning to stabilize the aircraft and maintain it on its flight path during the period between the failure indication to the pilot and his disengagement of the automatic pilot as required by IFR approach regulations.

The monitored dual servo channel system described herein includes a sensor circuit and logic circuit 50 which, instantly recognizes a failed condition, applies the appropriate brake 21 or 32 and alerts the pilot thereto so that he may disconnect and take over manual control. The logic circuit 50 comprises a servomotor output speed ratio detecting means 51, a servomotor output acceleration ratio detecting means 52, and associated logic gates to enable the brakes 21 or 32 and to alert the pilot of a malfunction or failure through pilot alert means 53. The speed ratio detector means 51 comprises absolute value detector elements 54 and 55 coupled to the outputs of tachometers 20 and 31, respectively, and a speed difference absolute value detector means 56 coupled to the output of a differential amplifier 57 whose inputs are coupled to the tachometers 20 and 31 with the polarity as shown. Accordingly, the outputs of the absolute value circuits 54, 55, and 56 are $|\dot\delta_A|$, $|\dot\delta_B|$ and $|\dot\delta_A - \dot\delta_B|$, respectively. The outputs of absolute value elements 54 and 56 are coupled to a ratio detector circuit 60 while the outputs of absolute value elements 55 and 56 are coupled to a ratio detector circuit 63. Ratio bias signals 61 and 64 are also coupled to the ratio detectors 60 and 64 to allow for component and manufacturing tolerances and to prevent nuisance disconnects for low level signals. The bias levels may be on the order of 10% of the full scale of the generator outputs. When the ratio of the absolute value of the difference between motor 16 and 28 speeds to the absolute value of either of the motors 16 (or 28) speeds exceeds a predetermined value, the output of detector 60 (or 63) goes "high". This predetermined value, in one application was approximately 0.40; i.e., when the absolute value of the speed difference was 40% of one motor speed, the detector output went "high". The "high" output of the ratio detectors 60 and 63 are coupled to the inputs of an OR gate 62. The output of the OR gate 62 is coupled to the "S" terminal of a conventional flip-flop 65 whose Q output is coupled to OR gates 66, 67 and 68, the outputs of which are coupled to pilot alerting means or warning devices 53, i.e, the OR gates 66, 67 and 68 are coupled to channel A warn element 70, channel B warn element 71 and autopilot pilot warn element 72, respectively, in the manner indicated.

The servomotor acceleration ratio detector means 52 comprises rate taker elements 80 and 81 responsive to the outputs of tachometers 20 and 31, respectively, for producing output signals corresponding to the acceleration of the respective servomotors 16 and 28. The absolute values of the outputs of rate takers 80 and 81 are provided by absolute value detector elements 82 and 83, the outputs of which are applied to each of the ratio detectors 84 and 85. Thus the outputs of absolute value detectors 82 and 83 are $|\dot{\delta}_A|$ and $|\dot{\delta}_B|$ respectively. The ratio detector elements 84 and 85 each include input bias signals 86 and 87, respectively, for the same purposes as biases 61 and 64 above. The output of ratio detector 84 is coupled to one input of an AND gate 90, the other input of which is coupled to the output of the OR gate 62 of the velocity detecting means 51. In like manner, the output of ratio detector 85 is coupled to one input of an AND gate 91 whose other input is similarly coupled to the output of OR gate 62. The outputs of the AND gates 90 and 91 are connected to the "S" terminals of conventional flip-flops 92 and 93, respectively, the Q outputs of which control the brakes 21 and 32, respectively. The Q output of flip-flop 92 is coupled to one input of OR gate 66 and 68 and, in like manner, the Q output of flip-flop 93 is coupled to one input of the OR gate 67 and 68 of the warning indicators 53.

The normal operation of the illustrated embodiment of the present invention will first be discussed and then its operation in response to two types of failures under typical flight conditions: A hardover failure of one of the channels with the aircraft in trimmed condition and the autopilot not responding to an input command. Such a failure could be attributed to a servo amplifier malfunction whereby it supplies an uncontrolled maximum output, a tumbled vertical gyro, an uncontrolled maximum or a zero output from a feedback transducer, etc., and a channel failure to zero output, such as would be caused by a failed servomotor or amplifier, with the aircraft in an untrimmed condition and the elevation holding a compensating load or under conditions where the servoes are responding to a command.

In normal operation, as described in the Miller patents, the steady state torques applied to the inputs 17 and 19 of differential 18 must be equal and opposite. Normal input commands to each channel will result in essentially equal speed/acceleration/torque input changes to the differential through the differential output feedbacks from transducers 41 and 42. These speed/acceleration changes are measured by tachometers 20 and 31 and applied to speed stabilize the closed loop channels and also to the monitor apparatus 50. Since the motor speeds are essentially equal, $|\delta_A - \delta_B|$ is essentially zero and therefore the values of the ratios $$\frac{|\dot{\delta}_A - \dot{\delta}_B|}{|\dot{\delta}_A| + \text{Bias}} \text{ and } \frac{|\dot{\delta}_A - \dot{\delta}_B|}{|\dot{\delta}_B| + \text{Bias}}$$

sensed by ratio detectors 60 and 63 are each low, i.e., as determined by the value of the "low speed" bias. Note that since it is the separate ratios of the absolute values of the motor speed difference to the absolute values of the speeds of each motor that is being monitored, the sensitivity of the ratio detectors is very high and not in any way compromised over the entire normal operating speed range of the servo loops. Also, since the motor accelerations are also essentially equal, $|\dot{\delta}_A|$ and $|\dot{\delta}_B|$ are also essentially equal and their ratios are detected by ratio detectors 84 and 85 are essentially unity or slightly less due to the "low speed" biases 86, 87; the detectors 84 and 85 outputs are "low". Thus, in normal operation, the ratio detectors 60, 63 and 84, 85 continuously track the motor speeds and acceleration of each of the channels over the system operating range.

In the first failure situation above, assume servo-amplifier 15 has failed hardover, i.e., supplies its full electrical output to motor 16; motor 28 is quiescent, its feedback loop being satisfied. As stated above, in normal steady state operation has torques applied by the motors 16 and 28 to differential 18 must be equal and opposing. In the following, reference may be made to FIG. 2 which shows the time histories of servomotor velocities and accelerations after a hardover failure. The dotted lines illustrate these histories in accordance with Miller's teachings while the solid lines represent the histories in accordance with the present invention. Now, however, motor 16 begins to accelerate rapidly and its velocity likewise rapidly increases in response to its uncontrolled high input since the initial load of gearing 35 and the "spring" effect of surface 40 is very low. As described by Miller in the patent (and not considering the present invention), the torque required to accelerate shaft 17 will be reflected, as the gearing and surface load increases, at servomotor 28 causing it to start to accelerate in the opposite direction, i.e., motor 16 tends to back drive motor 28 by virtue of the increasing mechanical load of the gearing 35 and elevator 40. However, due to the interface of motor 28 any reaction torque by shaft 29 tends to be passed along to the differential output and hence to feedback transducer 42 which produces a signal to amplifier 27 tending to increase the rate of rotation of motor 28 and shaft 29; i.e., accelerate it, in a direction opposite to that of the rotation of motor 16 of the failed channel, which serves to reduce the reaction torque at the differential output, the value of the reaction torque being very very small and due only to the signal gradient of tachometer 31, and the back EMF, windage and friction of the motor 28. Thus, in Miller there is significant surface motion.

Figure 2:
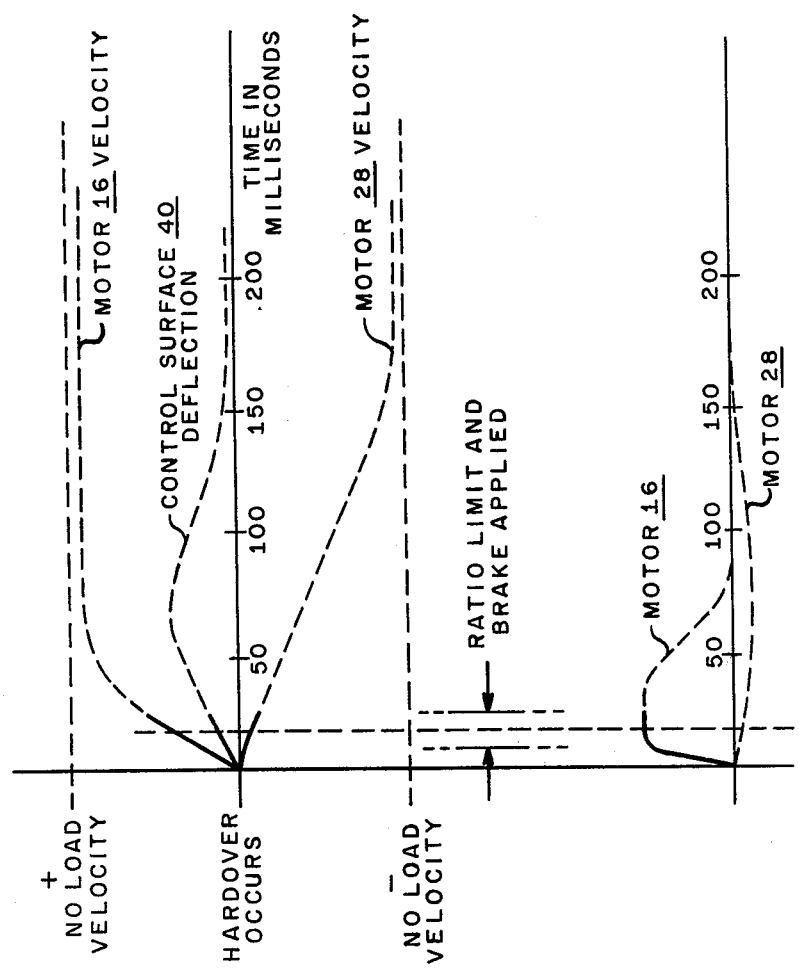
FIG. 2 is a diagram illustrating the time histories of the velocity and acceleration of each servomotor following a hardover failure.

However, in accordance with the teachings of the present invention, it will be noted that the relative speeds and accelerations of the motor shafts 17 and 29 being measured by the tach generators 20 and 31 respectively are being applied to sensor and logic apparatus 50. This apparatus detects the failure so rapidly, as evidenced by the solid curves of FIG. 2, that essentially no movement of the surface 40 and hence of the aircraft actually occurs. In apparatus 50 the absolute value of the difference between the speeds of motors 16 and 28 is determined and applied to each of the ratio detectors and 60 and 61. Note that the value of this term changes much more rapidly than either of its constituents. Simultaneously, the absolute value of the individual speeds of the motors 16 and 28 is also determined and applied to their respective ratio detectors 60 and 63. In the hardover failure under present consideration, motor 16 accelerates rapidly increasing its velocity rapidly (FIG. 2). Thus, even before the surface load through gearing 35 becomes effective to significantly back drive motor 28 there is a substantial difference in the relative velocities of motors 16 and 28. Since the instantaneous value of the velocity of motor 28 is very low compared to that of motor 16, the ratio of this value to the velocity difference between the motors rapidly increases. The limit ratio reaches its predetermined value quickly and the detector 60 output goes "high" supplying a logic signal to AND gates 90,91. In one embodiment of the present invention, the detectors 60, 63 limits were set such that their outputs went "high" when the difference in motor speed absolute values became 40% of the lowest absolute values of either of the motors 16 and 28 and in hardover cases, this limit was reached in 10 to 30 milliseconds as indicated in FIG. 2. Prior to the completion of the just described operation, the absolute values of the accelerations of the motors 16 and 28 had already been reached and were being compared in ratio detectors 84 and 85. The above-described characteristics of the dual servo/differential combination, the motor with the highest acceleration is the failed one and must be clamped. Since the absolute value of the acceleration of motor 16 is much greater than that of motor 28 (the latter has not yet been significantly affected by motor 16), ratio detector 84 output goes "high" while that of detector 85 by definition remains low. In the above embodiment, the acceleration detector ratio limits were set such that their outputs went high when their ratios exceeded 1.4, i.e., when one's acceleration exceeded the other's by 40%. Since the AND gate 90 is now satisfied, the Q output of flip flop 92 goes "high" operating the pilot's warning lights while the Q output goes low thereby de-energizing brake 21 causing it to clamp shaft 17. The clamped shaft 17 now provides a load to its differential input so that the servomotor 28 may continue to drive the elevator 40 in response to input commands to its amplifier 27 thereby allowing full automatic control of the aircraft during the time required for the pilot to disengage the automatic pilot system and take-over manually.

Now consider the second of the above failure situations wherein a channel fails substantially instantaneously to zero with each servo 16 and 28 contributing equal torques to the differential 18 to hold the out-of-trim aircraft in a reference attitude. Assume again that channel A fails in such a manner that the servomotor 16 is not energized. Since both motors 16 and 28 were contributing equal torques to hold the aerodynamic pressure on the control surface 40 prior to the failure, the differential torques were balanced. Now, however, with motor 16 no longer contributing its torque but with the motor 28 still contributing its torque, the differential becomes unbalanced and the surface load torque feeding back through reduction gear train 35 causes the motor shaft 17 and motor 16 to very rapidly accelerate with an attendant velocity increase. Since the motor 28 and shaft 29 acceleration is substantially zero (again, the closed loop of channel B not having had time to react), the ratio of the absolute values of the accelerations of shaft 17 relative to shaft 29 very rapidly increases producing a "high" output from ratio detector 84 to AND logic 90. Similarly, the attendant rapid increase in velocity of shaft 17 relative to that of shaft 28 will cause the absolute value of their difference to rapidly increase. Since the absolute value of the velocity of motor shaft 29 has not yet changed significantly, the ratio detector 60 limits are rapidly approached and exceeded resulting in a "high" output to AND logic 90, satisfying the logic requirements and energizing flip-flop 92 thereby de-energizing brake 21 and clamping motor shaft 17 from further movement. As in the first example, with the motor shaft 17 clamped, the good channel B may continue to stabilize the aircraft and maintain it on its flight path during the period the pilot is disconnecting the autopilot in response to the now energized warning indicators 53.

In one embodiment of the present invention, the response of the monitoring systems was extremely rapid, accomplishing its braking and warning function within ten to thirty milliseconds of the failure. With this speed of response of the system, the braking of the failed motor is accomplished before any significant motion of the control surface can occur and the aircraft will therefore experience no attitude transient or resulting departure from the flight path it is being controlled to follow.

It will now be appreciated that the monitored, dual channel automatic pilot described herein provides fail-safe performance by continuously monitoring both servomotor inputs to the differential gearing driving the control surface, in a manner such that of the ratio of the absolute values of their accelerations must continuously remain below a predetermined limit and that the ratio of the absolute value of the difference of their velocities relative to the absolute value of each must also continuously remain with a predetermined limit, and that when both limits are exceeded the servomotor with the highest absolute acceleration is clamped whereby, due to its substantially instantaneous response, essentially no surface motion will occur and no attitude or flight path deviation will be experienced by the aircraft.

While the invention has been described in its preferred embodiments, it is to be understood that the words which have been used are words of description rather than limitation in that changes may be made within the purview of the appended claims without departing from the true scope and spirit of the invention in its broader aspects.

I claim:

1. A monitored multiple channel automatic pilot for aircraft having a control surface controlled thereby for controlling the attitude and flight path of the aircraft comprising first and second substantially identical closed loop control channels responsive to attitude and flight path control signals and including corresponding first and second servomotors normally supplying substantially identical outputs for controlling said control surface, differential means having first and second inputs responsive respectively to the outputs of said first and second servomotors and an output connected to drive said control surface for controlling the attitude and flight path of said aircraft in response to said control signals, and monitor means continuously responsive to the ratio of the absolute values of the accelerations of said first and second servomotors and the ratio of the absolute values of the velocity difference between said first and second servomotor outputs and the velocity of each of said servomotors outputs for clamping that input to said differential means having the highest acceleration when said velocity ratio exceeds a predetermined value.

2. The monitored multiple channel automatic pilot as set forth in claim 1 further comprising tachometer generator means responsive to said first and second servomotor outputs for supplying signals respectively proportional to the velocities thereof, and circuit means responsive to said velocity signals for providing signals proportional respectively to the acceleration of said servomotors.

3. The monitored multiple channel automatic pilot as set forth in claim 2 further comprising means for clamping the respective inputs of said differential means, and logic means responsive to said acceleration and velocity ratios for actuating said clamping means.

4. The monitored multiple channel automatic pilot as set forth in claim 3 further comprising means responsive to said velocity signals for providing respective velocity value signals proportional to the absolute values thereof and a further value signal proportional to the absolute value of the difference therebetween, and ratio detector means responsive to said further value signal and each of said respective velocity value signals for providing logic signals to said logic means when the ratio of said further value signal and one of said respective velocity value signals exceeds a predetermined value.

5. The monitored multiple channel automatic pilot as set forth in claim 4 further comprising means responsive to said acceleration signals for providing signals respectively proportional to the absolute values thereof, and ratio detector means responsive to each of said absolute value signals for providing logic signals to said logic means when the ratio of one of said signals to the other exceeds a predetermined value.

6. The monitored multiple channel automatic pilot as set forth in claim 5 further including means for supplying bias signals to each of said ratio detector means for biasing one of the absolute value signals supplied to said ratio detector means for preventing nuisance outputs of said ratio detector means when the absolute velocity and accelerations of said servomotor outputs are of low values.

7. The monitored multiple channel automatic pilot as set forth in claim 3 further including flip flop means responsive to output signals from said logic means for supplying a first output signal for operating said clamping means, pilot warning means, and further logic means responsive to a second output signal from said flip flop means for operating said pilot warning means.

* * * * *